Figure 1:
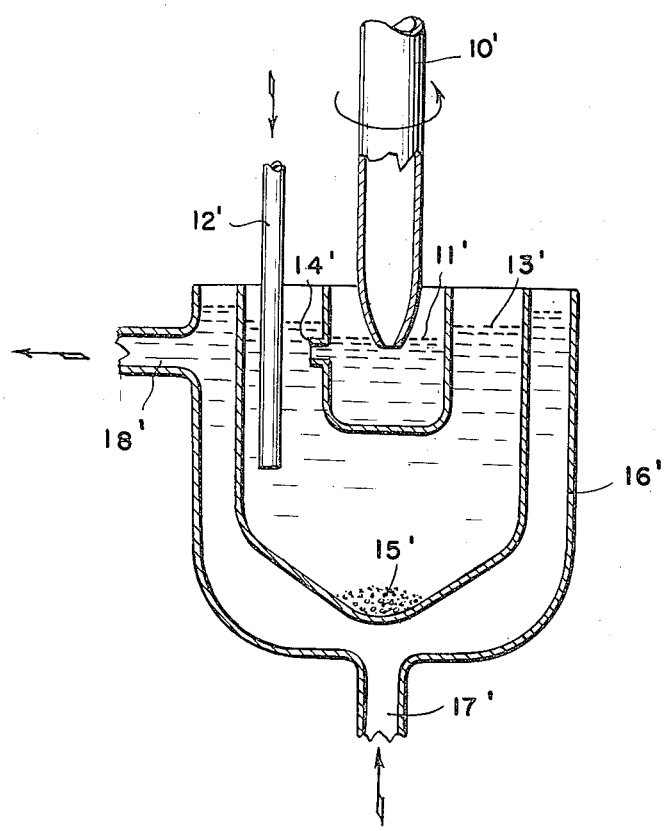

Oct. 9, 1956  E. WIEDEMANN  2,766,081
CENTRIFUGAL LUBRICATING SYSTEM
Filed April 7, 1954  2 Sheets-Sheet 1

INVENTOR
ERWIN WIEDEMANN,

BY Hendroth Lind & Ponack
ATTORNEYS

Oct. 9, 1956   E. WIEDEMANN   2,766,081
CENTRIFUGAL LUBRICATING SYSTEM
Filed April 7, 1954                                           2 Sheets-Sheet 2

INVENTOR
ERWIN WIEDEMANN,
BY Hiederath, Lind & Ponack
ATTORNEYS

United States Patent Office 2,766,081
Patented Oct. 9, 1956

2,766,081

CENTRIFUGAL LUBRICATING SYSTEM

Erwin Wiedemann, Riehen, Switzerland, assignor to Sandoz A. G., Basel, Switzerland, a Swiss firm Application April 7, 1954, Serial No. 421,541

Claims priority, application Switzerland January 28, 1952

4 Claims. (Cl. 308—168)

The present invention relates to an automatic centrifugal lubricating systems for the bearings of machines with vertical rotating shafts, which system assures proper bearing lubrication within the range of high speeds of from 5,000 to over 60,000 revolutions per minute.

Automatic centrifugal lubricating systems are known wherein oil is sucked up from an oil container by means of a hollow vertical rotating shaft, the oil being then supplied to the bearings through suitably arranged radial outlet openings (nozzles), if necessary being directed by means of baffle plates. Lubricating systems of this type are generally also circulating lubricating systems, since the oil flowing down from the bearings can be returned to the oil container.

The quantity of oil supplied per unit of time by such lubricating systems is, for a given cross section of suction opening of the shaft, approximately proportional to the centrifugal force at this point, i. e. is to a large extent proportional to the speed. This circumstance is of no moment with machines which operate at constant speed (R. P. M.), since in such cases the oil to be supplied to the bearings per unit of time is determined once for all by a suitable selection of the diameter of the suction opening of the shaft or of the nozzles. Nevertheless, for speeds above 10,000 revolutions per minute, very small nozzle openings are necessary in order to avoid overlubricating the bearings. It has therefore been proposed, in such cases, to restrict the supply of oil to the shaft by the interposition of a wick, which can simultaneously function as an oil filter. Such an arrangement suffices to overcome the dependence of the quantity of oil supplied per unit time on the speed, up to approximately 12,000 R. P. M. However, for machines which are to operate at speeds up to over 60,000 revolutions per minute, an arrangement of this type can not be employed, since its efficiency is not great enough and since clogging of the nozzles by wick fibers or penetration of the latter into the bearings would immediately result in damage to the machine.

It has been found that very simple mechanical means suffice to keep the amount of oil fed to the bearings constant within any desired limits, said means being free from the defects of other lubricating systems. At the same time, it is possible to replace the oil filter action of a wick or the like by a sedimentation effect. Arrangements of this type can also be fitted in very simple manner with a cooling device for reducing or keeping constant the temperature of the lubricant, and thus also of the bearings. Consequently, not only can this lubricating system be employed over a very great range of speed, but it also ensures adequate lubrication at extremely high speeds.

The present invention therefore relates to an automatic lubricating system for the bearings of machines with vertical rotary shafts, which system is characterized by the following details:

The free cross section of the suction opening of the shaft is made of such size that, at the lowest speed of operation, a sufficient bearing lubrication is assured; the nozzle areas are made larger than necessary for this purpose.

For high speeds, the flow of oil to the bearings must therefore be reduced. This is accomplished as follows:

The oil is placed in two containers, preferably arranged one inside the other and communicating by a small opening in the wall of the inner container. The oil is sucked up from the center of the inner container, while the outer container receives the oil returned from the bearings. The outer container may be surrounded by a cooling device which ensures that the bearings are supplied with oil at a sufficiently low temperature. The opening between the two containers must be of sufficiently small dimensions that in the event of increased suction due to high speed it restricts the flow of oil from the outer to the inner container. This device operates as follows: At low speeds of rotation, the shaft sucks up less oil than can flow through the opening between the two oil containers; at higher speeds the volume of lubricant sucked up by the shaft at first increases; if the speed is increased still further, lubricant in the inner container is sucked up faster than it can flow in from the outer container. As a result, the supply of oil to the bearings is unable to exceed a certain maximum and lubrication becomes intermittent.

Experience has shown that this system of lubrication is wholly adequate over the range from 5,000 to 60,000 R. P. M. and that the intermittent lubrication at very high speeds is without consequence.

The outer oil container, which is usually fitted with a cooling jacket, may have such a form that impurities suspended in the lubricant returned from the bearings settle on the bottom. Since the lubricant in the outer container is not affected by the rotation of the shaft, the sediment remains undisturbed.

In this way, the present invention ensures not only that the correct quantity of oil is fed to the bearings at whatever speed is employed, but also that the oil is free from impurities, without the use of a filter, and is adequately cooled.

It has been found that a system of the above design guarantees continuous, reliable and automatic lubrication of the bearings of machines operated at speeds of 5,000 to more than 60,000 revolutions per minute.

Figure 2:
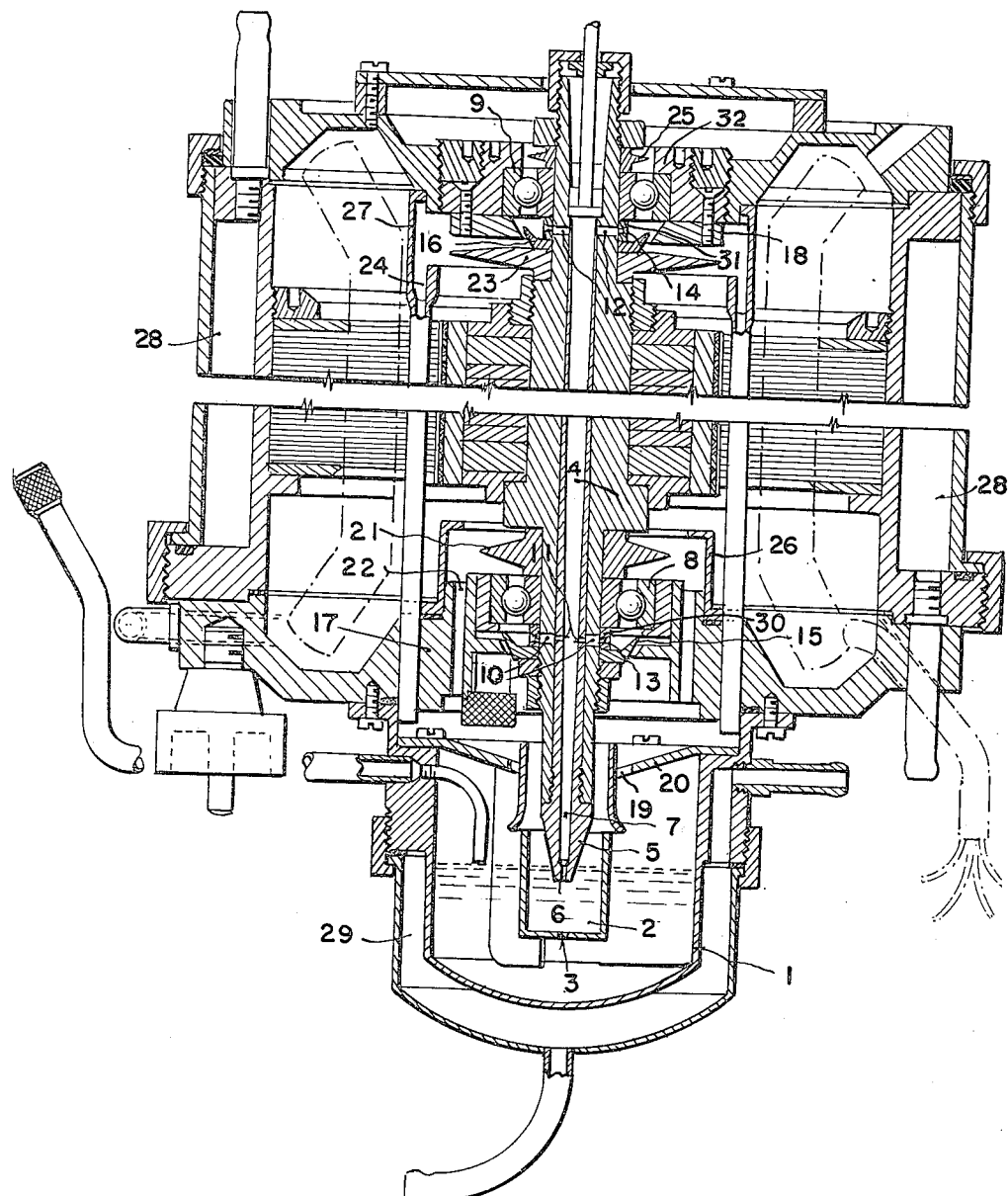

The accompanying figures of drawing illustrate the presently-preferred embodiment of the invention. Of these figures of drawing, Fig. 1 represents diagrammatically a simplified cross section through a portion of the system according to the invention. Fig. 2 shows a cross section through an electric motor, adapted to operate at speeds up to 60,000 R. P. M. or more and fitted with a lubricating system according to this invention.

Referring first to Fig. 1 of the drawings, reference numeral 10' designates the vertical hollow shaft which is supported by a plurality of spaced bearings and which sucks from the inner oil container 11' the oil to be supplied to the bearings (not shown), while the oil return 12' leads from the bearings to the outer oil container 13'. The two concentrically arranged oil containers communicate with each other by means of a small opening 14' in the wall of the inner container 10'. Impurities suspended in the oil which may penetrate into the return tube 12' settle by sedimentation at the lowest point 15' in the outer container 13', which is also provided with a cooling jacket 16' having a cold water inlet 17' and a cooling water outlet 18'.

Referring now to Fig. 2, the principle involved is the same as before, namely, that of using the centrifugal force developed at the inner wall of the rotating hollow shaft to effect the transport of the oil, provision being made for separate, indirect lubrication of each of the bearings with a fine spray of cooled oil circulating in a close circuit.

In the construction according to Fig. 2, the oil enters the hollow shaft 4 through an orifice 6 in the lower end of the insert 5 which may, for example, be press-fitted into the bore of shaft 4. It is important that the diameter of this orifice should be large enough to ensure adequate lubrication of the bearings at the lowest speeds of operation, i. e. at approximately 5,000 R. P. M. The oil outlets 11 and 12 and the nozzles 13 and 14 have larger diameters than necessary for this purpose.

Since such a system would feed too much oil to the bearings at medium speeds of rotation, i. e., at speeds between approximately 15,000 and 40,000 R. P. M., the oil supply is controlled in the following manner: The oil reservoir 1 contains an inner cup-shaped compartment 2, and the two vessels communicate through an orifice 3. As the rate of flow of oil through the shaft increases with increasing speed of rotation, less oil flows through the orifice 3 than is sucked up by the shaft, provided that the orifice 3 is of suitable size. Consequently, lubrication becomes intermittent and, at the same time, the quantity of oil delivered becomes stationary.

For very high speeds of rotation, i. e., speeds of 40,000 to more than 60,000 R. P. M., the following additional devices have proved necessary.

The insert 5 of the shaft 4 must have a conical bore increasing in diameter towards the top. If the bore were cylindrical, the centrifugal forces acting on the oil would offer increasing resistance to its passage upwards through the shaft as the speed of rotation increased. It is therefore necessary to provide an additional force acting on the oil in an upward direction. This can be achieved by making the bore conical, since the centrifugal force can then be resolved into two components, one of which acts in an upward direction.

It is necessary to provide for separate, indirect lubrication of each of the bearings with oil spray.

For this purpose, oil outlets 10 and 12 are provided in the shaft 4 and oil outlets 11 are provided in the insert 5, these outlets being placed below the respective bearings. In addition, special circular rings 30 and 31 are mounted on the shaft 4 and have therein diametrically arranged openings 13, 14 which are aligned with outlets 10, 11 and outlet 12, respectively, and which openings 13 and 14 operate after the manner of nozzles to nebulize the oil after it emerges from openings 10 and 11 and opening 12. Deflecting vanes 15 and 16, which rotate with the shaft, and non-rotating deflecting collars 17 and 18 rigidly attached to the stator 32, said vanes and collars having bevelled inner faces direct the oil spray on to the bearings.

The following devices serve to ensure reliable and instantaneous automatic operation:

The oil flowing off or flung off from the bearings is directed into the oil conduits 22, 24 within the lower bearing support and the slots of the stator of the motor respectively, by means of the centrifugal rings 21, 23 and collecting aprons 26 and 27 and then flows down over the guide-plate 20 and through the opening 19 into the oil reservoir 1 while the centrifugal ring 25 prevents oil from escaping at the top. The oil-collecting aprons 26, 27 form a seal against the stator and thus prevent oil being lost by penetration into the stator.

The oil reservoir 1 has a depressed, concave base for collecting impurities in the oil. This device replaces an oil filter, the use of which would not, as hereinbefore mentioned, be permissible in the case of machines rotating at very high speeds, since clogging of the nozzle openings 13 or 14 with fiber particles, or the penetration of fibers into the bearings, would rapidly destroy them. Purification of the oil in the oil reservoir 1 by sedimentation is made possible by the fact that the motions of the oil in the inner container 2 set up by the rotation of the shaft 4 are not transmitted to the contents of the outer container.

From Fig. 2 it may also be seen that both the stator of the motor and the oil reservoir 1 are surrounded by cooling jackets. In view of the very small clearances permissible in such motors and the necessity of maintaining the correct degree of play in the bearings, some form of cooling is indispensable to counteract the relatively large amounts of heat developed by motors operating at very high speeds. The cooling of the stator is effected by a simple manner by means of an essentially conventional cooling jacket 28. The cooling of the rotor and the bearings, however, can only be carried out indirectly, by supplying cooled oil to the hollow shaft and the bearings. For this reason, the oil reservoir 1 is also provided with a cooling jacket 29. Each jacket is of course provided with inlet and outlet openings.

Since the oil taken up by the insert 5 of the shaft 4 is continually being replaced by oil passing through the orifice 3 into the inner oil container 2 from the outer oil container 1, which in turn collects the oil running back from the bearings, and since the oil-collecting trays 26, 27 prevent leakage of oil into the stator, circulation of the oil without loss is guaranteed, thus enabling such motors or other similarly constructed machines to be kept in permanent operation. The special precautions taken ensure that continuous running is possible even at very high speeds.

The present application is in part a continuation of copending application, Serial No. 333,743, filed January 28, 1953, and which has been abandoned since the filing of the present application.

Having thus disclosed the invention, what is claimed is:

1. In an automatic centrifugal lubricating system for journal bearings, wherein oil is supplied through a hollow, vertical shaft journaled in said bearings and provided with oil outlets for lubricating the said bearings, means for maintaining a circulation of oil adequate for speeds of rotation of said shaft between approximately 5,000 and 60,000 R. P. M., the said means comprising: an oil inlet at the lower end of the shaft providing an effective flow of oil to the said bearings at speeds between approximately 5,000 and 20,000 R. P. M.; a double oil reservoir consisting essentially of an inner cup-shaped oil-chamber, into which the said shaft extends with its lower end below the level of oil in said inner oil-chamber, and of an outer oil-chamber, whereby rotation of the oil in the inner chamber due to rotation of the shaft is not transmitted to the oil in the outer chamber so that collection of impurities from the last-mentioned oil by sedimentation is facilitated, the wall of the inner oil-chamber having an opening therein interconnecting the interiors of both chambers, the quantity of oil flowing through said opening into the said inner chamber regulating the supply of oil to the said bearings at speeds between approximately 20,000 and 40,000 R. P. M.; said shaft having a conical bore, the diameter increasing towards the top, thereby ensuring an adequate flow of oil to the said bearings at speeds between approximately 40,000 and 60,000 R. P. M.; said shaft being provided below said bearings and adjacent thereto with outlet passages from the said bore, with means for nebulizing oil passing out through said passages, and with deflecting vanes rotating with the shaft and deflecting the oil toward the bearings, thus effecting indirect lubrication of the said bearings with oil spray; non-rotating deflecting collars surrounding the said nebulizing means and having beveled inside faces diverging upwards whereby they also help to direct the oil spray on to the said bearings; centrifugal ring means attached to the said shaft immediately above the bearings for preventing upward escape of oil therefrom; and apron means surrounding the bearings and directing oil thrown therefrom and flowing thereonto from the bearings back to said outer oil-chamber.

2. The relationship of parts according to claim 1, said outer chamber having a depressed concave bottom where the impurities in the oil can collect by sedimentation.

3. The relationship of parts according to claim 1, and a cooling jacket surrounding the oil reservoir for cooling the oil, whereby the circulating oil also serves to effect the indirect cooling of the shaft and the bearings.

4. The relationship of parts according to claim 1, wherein the system is the lubricating system of an electric motor comprising a stator, and wherein said apron means is disposed between the said shaft and bearings on the one hand and the stator of the motor on the other hand, whereby penetration of oil into said stator is prevented.

References Cited in the file of this patent

UNITED STATES PATENTS

| | | |
|---|---|---|
| 706,120 | Short | Aug. 5, 1902 |
| 1,180,338 | Symanzik | Apr. 25, 1916 |
| 1,920,326 | Schuck | Aug. 1, 1933 |
| 2,012,579 | Obayaski | Aug. 27, 1935 |
| 2,062,920 | Mapes | Dec. 1, 1936 |